Patented Oct. 11, 1932

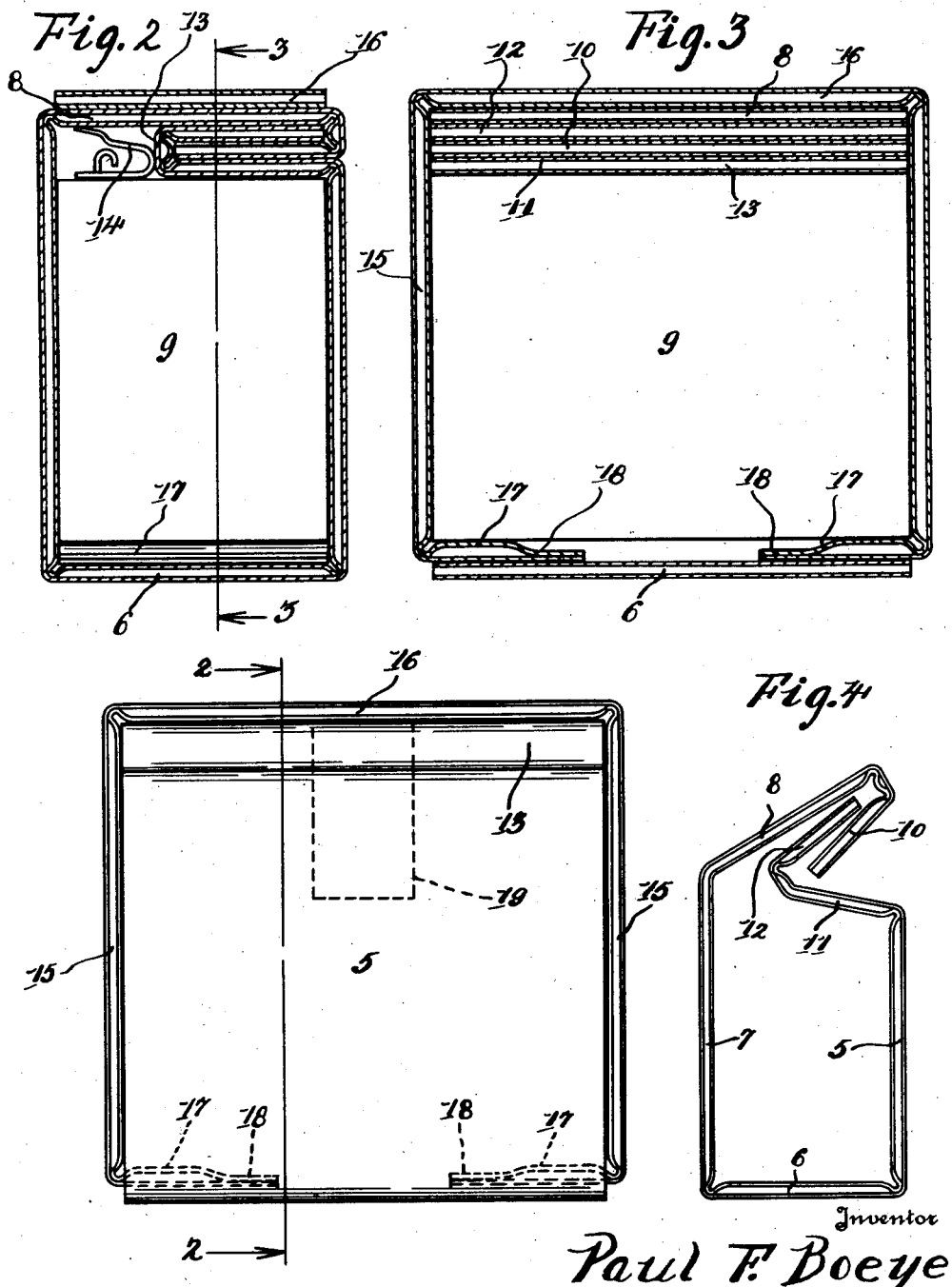

1,882,565

UNITED STATES PATENT OFFICE

PAUL F. BOEYE, OF ST. PAUL, MINNESOTA, ASSIGNOR TO WALDORF PAPER PRODUCTS COMPANY, OF ST. PAUL, MINNESOTA, A CORPORATION OF MINNESOTA

CONTAINER FOR BATTERIES OR THE LIKE REISSUED

Application filed August 27, 1930. Serial No. 478,152.

It is my object to provide an unusually inexpensive container for dry batteries of the type used in radio receiving sets to efficiently protect such batteries during shipping and handling. More particularly, it is my object to provide a snugly fitting container and at the same time to reduce the cost of a container of this type by forming it entirely from rectangular strips of suitable sheet material, such as corrugated board, and by eliminating separate fastening devices. The invention also includes certain other novel features of construction which will be more fully pointed out in the following specification and claims.

Referring to the drawing, which illustrates the best form of my device at present known to me, Figure 1 is a front elevation of my improved container; Fig. 2 is a vertical section through the same taken on the line 2—2 of Fig. 1 and showing a battery in place therein; Fig. 3 is a vertical section taken on the line 3—3 of Fig. 2 and Fig. 4 is an end view of the main blank showing the interlocking flanges in partially closed position.

My improved container is preferably constructed from corrugated sheet material formed in two rectangular pieces without slots or reentrant angles. The several panels, flaps and flanges are formed by merely creasing the blanks transversely along parallel lines. The main blank, best shown in Fig. 4, has a front panel 5, a bottom panel 6, a back panel 7 and a top panel 8 adapted to cover four sides of a rectangular battery 9. Integral with the top panel 8 is a reentrant flange 10, adapted to be folded between flanges 11 and 12 formed on the free end of the front panel 5, to form a pad 13, Figs. 1 and 2, for protecting the terminals 14 of the battery. These terminals 14 project from the top of the battery.

The second or outer rectangular blank is creased transversely to form end panels 15 adapted to cover the ends of the battery and a top panel 16 adapted to extend on the exterior of the panel 8. The ends of the outer blank are creased transversely to form locking flaps 17 adapted to fit snugly between the bottom of the battery 9 and bottom panel 6 of the main blank. The inner extremities of these flaps 17 are reduced in thickness by crushing the corrugations and securing them in compressed form by adhesive. Thus wedge-shaped extremities 18 are formed on the flaps to facilitate forcible insertion of the same between the battery and bottom panel 6.

The method of procedure to pack the batteries in the container will now be readily understood. The battery is first placed in the main blank which is closed by merely folding the flange 10 between the flanges 11 and 12. Finally the outer blank is applied and the wedge-shaped extremities 18 of the flaps 17 are forcibly inserted between the bottom of the battery and bottom panel 6. The front and back panels of the main blank are of such a length that when the flaps 17 are inserted they are securely gripped and this securely holds the main blank upon the battery. The interlocking flanges 10, 11 and 12 prevent removal of the front and back sides 5 and 7.

It is common practice to ship a number of the individual batteries in a larger container and when this is done the batteries in my improved, individual containers fitting in the larger container require no separate fastening, such as the usual tape. Where single batteries are to be shipped, suitable adhesive tape may be applied to the bottom corners to prevent outward movement of the panels 15 from the battery. If protection for the ends of the battery is not desired or necessary, the outer blank may be omitted and a short piece of adhesive tape may be applied to join the pad 13 to the front panel 5, as indicated at 19 in Fig. 1.

It is to be understood that in the foregoing specification and in the appended claims the terms "ends", "top", "bottom", "front", "rear", or "back", as applied to the sides or panels, are employed for convenience of reference only and in no way to limit the invention, as it is evident that any side of the battery or container may be considered as the top, bottom, front, end, back or rear.

Having described my invention what I claim as new and desire to protect by Letters Patent is:

1. In a container for a rectangular body, such as a battery, having on one side a projecting member to be protected, a single, long and relatively narrow, rectangular sheet of corrugated board folded to cover four sides of said body and interlocking flanges on the free ends of said sheet respectively, positioned adjacent to said projection to form a space within the container for said projection and to retain said sheet in contact with the sides of said body, the flange on one end of said sheet being confined in overlapping relation to a pair of flanges on the opposite end of the sheet and having its free edge abutting against the fold line between said pair of flanges.

2. In a container for a rectangular body, such as a battery, having on its top a projecting member to be protected, a main blank folded to form top, bottom, front and rear panels to cover the corresponding sides of said body, a reentrant flange formed on the free edge of said top panel and a pair of flanges formed on the free edge of said front panel to receive said first mentioned flange in overlapping relation between them and thereby form a pad for protecting said projection comprising three thicknesses of board.

3. In a container for a rectangular body, such as a battery, having at its top a projecting member to be protected, a main blank folded to form front, rear, bottom and top panels to cover the corresponding sides of said body and an integral pad to space the top panel from the top of the body, said pad having a tendency to spring away from the top of said body and an outer blank folded to form end panels to cover the ends of said body and to overlap said top panel and flaps on the free ends of said end panels insertable between said bottom panel and body to confine said pad and end panels in engagement with the top and ends respectively of said body.

4. The container specified in claim 3 in which said pad is formed by interlocking, overlapping flanges of substantially equal superficial area on the free ends of said cover and front panels respectively arranged to space said top panel from the top of said body.

5. The container specified in claim 3 in which said pad comprises a reentrant flange formed on the free edge of said top panel and a pair of flanges formed on the free edge of said front panel to receive said first mentioned flange in overlapping relation between them, said flanges being formed by parallel creases and the flange on said top panel engaging the crease between the flanges on said front panel.

In testimony whereof, I have hereunto signed my name to this specification.

PAUL F. BOEYE.